(12) United States Patent
Chung et al.

(10) Patent No.: US 11,604,805 B2
(45) Date of Patent: Mar. 14, 2023

(54) TERMINAL, STORAGE MEDIUM, AND DATABASE SYNCHRONIZATION METHOD THEREOF

(71) Applicant: Chinese University of Hong Kong in Shenzhen, Shenzhen (CN)

(72) Inventors: Yeh-Ching Chung, Shenzhen (CN); Yuan Yu, Shenzhen (CN)

(73) Assignee: CHINESE UNIVERSITY OF HONG KONG IN SHENZHEN, Shenzhen (CN)

(*) Notice: Subject to any disclaimer, the term of this patent is extended or adjusted under 35 U.S.C. 154(b) by 194 days.

(21) Appl. No.: 17/110,780

(22) Filed: Dec. 3, 2020

(65) Prior Publication Data

US 2022/0075799 A1 Mar. 10, 2022

(30) Foreign Application Priority Data

Sep. 8, 2020 (CN) .......................... 202010933547.2

(51) Int. Cl.
*G06F 16/00* (2019.01)
*G06F 16/27* (2019.01)
*G06F 16/2455* (2019.01)
*G06F 16/21* (2019.01)

(52) U.S. Cl.
CPC ............ *G06F 16/27* (2019.01); *G06F 16/214* (2019.01); *G06F 16/2456* (2019.01); *G06F 16/24552* (2019.01)

(58) Field of Classification Search
CPC .. G06F 16/27; G06F 16/214; G06F 16/24552; G06F 16/2456; G06F 16/2358; G06F 16/273
See application file for complete search history.

(56) References Cited

U.S. PATENT DOCUMENTS

| | | | |
|---|---|---|---|
| 2020/0151560 A1* | 5/2020 | Song | G06N 5/022 |
| 2021/0056567 A1* | 2/2021 | Hossain | G06Q 30/0202 |
| 2021/0056595 A1* | 2/2021 | Hossain | G06Q 30/0277 |

FOREIGN PATENT DOCUMENTS

| | | | | |
|---|---|---|---|---|
| CN | 111506556 A | * | 8/2020 | |
| WO | WO-2020232012 A1 | * | 11/2020 | G06F 12/0802 |

* cited by examiner

*Primary Examiner* — Alexander Khong
(74) *Attorney, Agent, or Firm* — WPAT, PC

(57) ABSTRACT

A terminal, a storage medium, and a database synchronization method thereof are disclosed. The database synchronization method includes reading data from a first database and capturing a dynamic data log in the first database; joining data to a waiting queue read from the first database; determining a dislocation category of the data in the waiting queue, and rearranging the dislocation data in the waiting queue into a first category according to the dynamic data log; and synchronizing the rearranged data to a second database. According to the database synchronization method provided by the present invention caches the data read from the first database to the waiting queue, and dislocation data in the waiting queue is rearranged and then synchronized to the second database, so that a problem of poor data identity after database synchronization is avoided.

12 Claims, 2 Drawing Sheets

TERMINAL, STORAGE MEDIUM, AND DATABASE SYNCHRONIZATION METHOD THEREOF

CROSS-REFERENCE TO RELATED APPLICATION

This application claims priority to Chinese Patent Applications No. CN202010933547.2 filed on 2020 Sep. 8, which is hereby incorporated by reference in its entirety.

BACKGROUND

Technical Field

The present invention relates to large data fields, and more particularly to a terminal, a storage medium and a database synchronization method thereof.

Related Art

In the prior art, hybrid databases are widely used, and the existing database synchronization mechanism is relatively dependent on a source database, so that the source data is easily affected, and data misalignment often occurs in a synchronization process, so that data identity cannot be ensured after the database is synchronized.

Accordingly, the prior art remains to be upgraded and improved.

SUMMARY

It is noted that the present disclosure includes one or more inventive solutions currently claimed or not claimed, and in order to avoid confusion between the illustration of these embodiments in the specification, a number of possible inventive aspects herein may be collectively referred to "present/the invention."

A number of embodiments are described herein with respect to "the invention." However, the word "the invention" is used merely to describe certain embodiments disclosed in this specification, whether or not in the claims, is not a complete description of all possible embodiments. Some embodiments of various features or aspects described below as "the invention" may be combined in various ways to form the terminal, the storage medium and the database synchronization method thereof.

In view of the above-mentioned drawbacks of the related art, a terminal, a storage medium, and a database synchronization method, are provided to solve the problem described in the related art that data identity cannot be ensured in the database synchronization process.

The present disclosure is directed to a terminal, a storage medium and a database synchronization method thereof in various aspects to solve the above problems.

It is an object of the claimed invention to provide a database synchronization method comprising:
reading data from a first database and capturing a dynamic data log in the first database;
joining data to a waiting queue read from the first database;
determining a dislocation category of the data in the waiting queue, and rearranging the dislocation data in the waiting queue into a first category according to the dynamic data log; and synchronizing the rearranged data to a second database.

In some embodiments of the present disclosure, wherein the data is read from the first database through a LinkedIn data bus.

In some embodiments, wherein a RabbitMQ engineering cache is used for joining data read from the first database to the waiting queue.

In some embodiments, rearranging the dislocation data in the waiting queue according to the dynamic data log into the dislocation data of the first category comprises: extracting the dislocation data in the waiting queue into a restriction engine when the dislocation category of the data in the waiting queue is the first category; and rearranging the data in the restriction engine when the content in the restriction engine is not null.

In some embodiments, rearranging data in the restriction engine includes: obtaining a data reading time and a data bus running time for reading data from the first database according to the dynamic data log; and rearranging the data in the restriction engine according to the data reading time and the data bus running time.

In some embodiments, after determining the dislocation category of the data in the waiting queue, the method further comprises: initiating data synchronization state policing when a dislocation category of data in the waiting queue is a second category.

In some embodiments, synchronizing the rearranged data to the second database includes: adding the rearranged data to an uploading queue when the content in the restriction engine is null; and collecting cached data in the uploading queue and synchronizing the cached data in the uploading queue to the second database.

In some embodiments, after the collecting cached data in the uploading queue, the database synchronization method of the present disclosure further includes: converting the uploading queue into an applicable UPSERT or DELETE queue.

It is another object of the claimed invention to provide a terminal comprising a processor, a storage medium communicatively connected to the processor, the storage medium being adapted to store a plurality of instructions, the processor being adapted to invoke the instructions in the storage medium to perform the steps of implementing the database synchronization method described in any one of the above.

It is another object of the claimed invention to provide a storage medium storing at least one program executable by at least one processor to implement the steps of the database synchronization method described in any one of the above.

The present disclosure achieves one or any combination of the following advantages through the above-mentioned designs: the present disclosure provides a terminal, a storage medium, and a database synchronization method thereof. According to the database synchronization method provided by the present disclosure caches the data read from the first database to the waiting queue, and dislocation data in the waiting queue is rearranged and then synchronized to the second database, so that a problem of poor data identity after database synchronization is avoided.

BRIEF DESCRIPTION OF THE DRAWINGS

The disclosure will become more fully understood from the detailed description given herein below for illustration only, and thus not limitative of the disclosure, wherein.

DETAILED DESCRIPTION

In order to make the abovementioned objects, features, and advantages of the present invention more comprehensible, specific embodiments of the present invention will be described in detail below with reference to the accompanying drawings.

A database synchronization method according to the present invention may be applied to a terminal, which may be, but is not limited to, a variety of computers, notebook computers, mobile phones, tablet computers, and the like.

Figure 1:
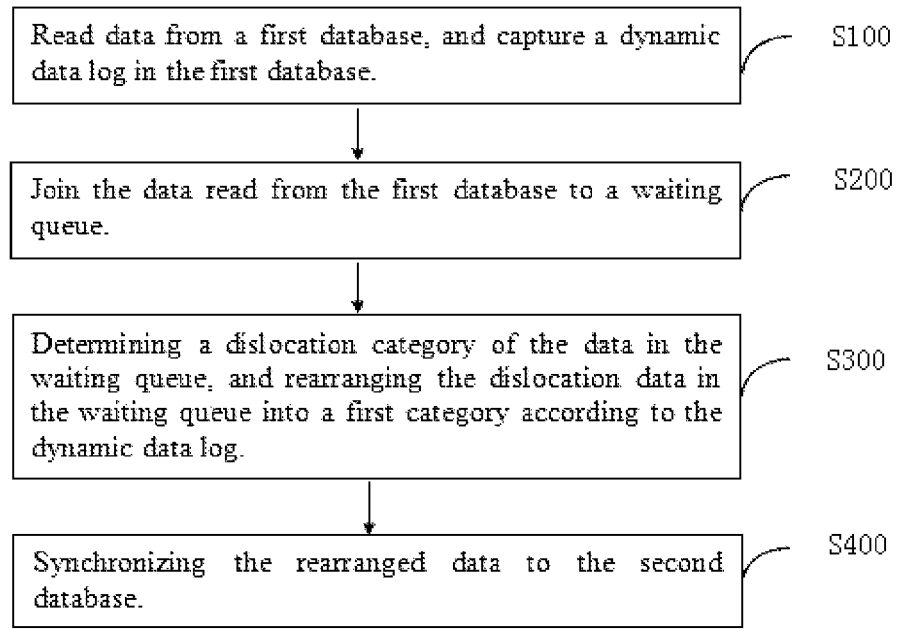
FIG. 1 is a flowchart of an embodiment of a database synchronization method according to the present invention.

As shown in FIG. 1, the database synchronization method provided by the present invention includes the following steps.

Step S100. Read data from a first database, and capture a dynamic data log in the first database.

In some embodiments, data in a first database, which may be an SQL database or a non-SQL database, and a second database, which may be a non-SQL database or an SQL database, are synchronized. When data in the first database and the second database are synchronized, data is first read from the first database, and a dynamic data log in the first database is captured. The dynamic data log in the first database records an event occurring in the first database, and information such as a time of storing or modifying the data in the first database and a time of reading the data from the first database can be acquired according to the dynamic data log.

In some embodiments, the data is read from the first database through a LinkedIn data bus, and the data is read from the first database through the LinkedIn data bus due to the self-contained characteristics of the LinkedIn data bus itself, so that the contents of the data can be kept consistent.

Step S200. Join the data read from the first database to a wait queue.

In some embodiments, a waiting queue is provided, and after data is read from the first database, the data is added to the waiting queue. Specifically, the data read from the first database is added to the waiting queue by using an RabbitMQ engineering cache. The RabbitMQ engineering cache is capable of maintaining a minimum impact on the source database, and using the RabbitMQ engineering cache to add the data read from the first database to the wait queue is capable of preventing data synchronization from affecting the source data in the first database.

Step S300. Determining a dislocation category of the data in the waiting queue, and rearranging the dislocation data in the waiting queue into a first category according to the dynamic data log.

Specifically, in some embodiments, two categories of dislocation of data are provided. The first category is a data dislocation generated by cyclic repetition, which may also be referred to as a conventional dislocation, and the second category is an accidental dislocation, which may also be referred to as a rare dislocation. When the dislocation category of the data is the first category, the dislocation can be eliminated by rearrangement.

Figure 2:
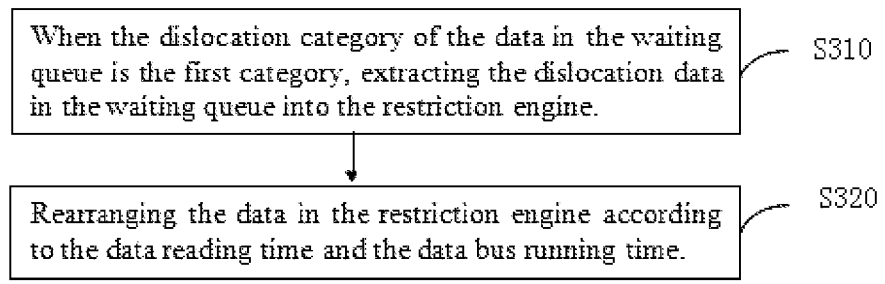
FIG. 2 is a flow chart of sub-steps of step S300 in an embodiment of the database synchronization method according to the present invention.

As shown in FIG. 2, the rearranging the dislocation data in the waiting queue according to the dynamic data log in which the dislocation category is the first category includes following steps.

Step S310. When the dislocation category of the data in the waiting queue is the first category, extracting the dislocation data in the waiting queue into the restriction engine. When the dislocation category of the data in the waiting queue is the first category, the dislocation data in the waiting queue may be rearranged to eliminate the dislocation. At this time, the dislocation data in the waiting queue may be extracted to the restriction engine, and subsequently the data in the restriction engine may be rearranged.

Step S320. When the content in the restriction engine is not null, rearranging the data in the restriction engine.

When the content in the restriction engine is not null, the data in the restriction engine is rearranged to eliminate dislocation. Note that even if the dislocation category of the data in the waiting queue is the second category, the data in the waiting queue is not extracted into the restriction engine at this time, but there may be dislocation data in the previous data stream extracted into the restriction engine at this time, and the data in the restriction engine continues to be rearranged at this time.

Figure 3:
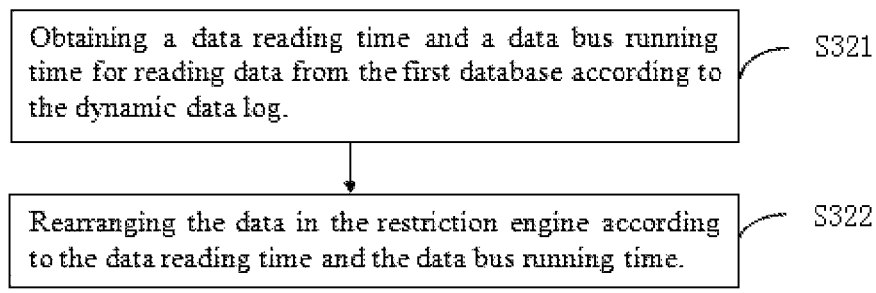
FIG. 3 is a flow chart of sub-steps of step S320 in an embodiment of the database synchronization method according to the present invention.

Specifically, as shown in FIG. 3, the rearranging the data in the restriction engine includes the following steps.

Step S321. Obtaining a data reading time and a data bus running time for reading data from the first database according to the dynamic data log.

Step S322. Rearranging the data in the restriction engine according to the data reading time and the data bus running time.

The data reading time is a time at which data is read from the first database, and the data bus running time is a total time at which data is captured and cached to complete reading. Since there is a delay in the process of data reading, there may be a time sequence change in which read from the first database is cached and cached to the waiting queue, forming a dislocation.

In some embodiments, the dynamic data log in the first database is also captured while data is read from the first database, so that the data reading time and the data bus running time corresponding to each data can be obtained, and the sorting of the data captured from the first database can be restored according to the data reading time and the data bus running time, that is, the data can be rearranged. In some embodiments, the data in the restriction engine is rearranged according to the data reading time and the data bus running time.

When the dislocation category of the data in the waiting queue is the second category, since the second category is an accidental dislocation, it is not regular and cannot be automatically rearranged by data such as reading time. At this time, the data synchronization state policing is started. The data synchronization state policing may be implemented by a preset database monitoring system. When the dislocation category of the data in the waiting queue is the second category, the database monitoring system is triggered to police the data synchronization state, and the dislocation data is corrected accordingly.

Referring again to FIG. 1, the database synchronization method provided in the present disclosure further includes the following steps.

Step S400. Synchronizing the rearranged data to the second database.

Figure 4:
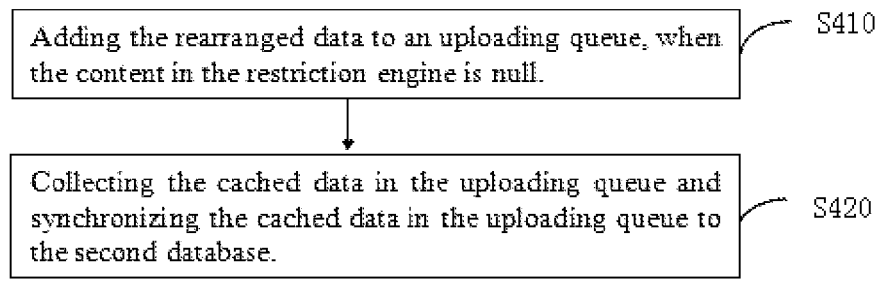
FIG. 4 is a flow chart of sub-steps of step S400 in an embodiment of the database synchronization method according to the present invention.

Specifically, as shown in FIG. 4, the synchronizing the rearranged data to the second database includes the following steps.

Step S410. Adding the rearranged data to an uploading queue, when the content in the restriction engine is null.

Step S420. Collecting the cached data in the uploading queue and synchronizing the cached data in the uploading queue to the second database.

Specifically, when the content in the restriction engine is null, it indicates that the data (the data of the dislocation category is the first category) in which the conventional dislocation is generated has been rearranged, and the dislocation is eliminated. At this time, the rearranged data is added to the uploading queue. After the rearranged data is added to the waiting queue, the cached data in the uploading queue is collected, the cached data in the uploading queue is synchronized to the second database, so that the data in the first database is synchronized to the second database, and data identity between the first database and the second database is ensured.

In some embodiments, the rearranged data is added to the uploading queue by using the RabbitMQ engineering cache, and the RabbitMQ engineering cache can perform multi-user data flow allocation, that is, synchronization between the first database and a plurality of the second databases can be realized.

After synchronizing the cached data in the uploading queue to the second database, it is necessary to continue the synchronization process of the next data stream. In order to prevent an error caused by repeated synchronization of the data stream, in some embodiments, after the cached data in the uploading queue is collected, the method further includes the step of: Converting the uploading queue into an applicable UPSERT or DELETE queue.

After collecting the cached data in the uploading queue, converting the uploading queue into an applicable UPSERT or DELETE queue, that is, updating the uploading queue when the rearranged data is added to the uploading queue when the next data flow is synchronized. Alternatively, the uploading queue is deleted, and a new uploading queue is re-created.

In summary, the database synchronization method provided by the present disclosure caches the data read from the first database to the waiting queue, and dislocation data in the waiting queue is rearranged and then synchronized to the second database, thereby avoiding a problem of poor data identity after database synchronization.

It is to be understood that although the steps in the flow charts given in the drawings of the present invention are shown in sequence as indicated by the arrows, these steps are not necessarily performed in sequence as indicated by the arrows. Unless explicitly stated herein, the execution of the steps in the present invention is not limited in strict order, and these steps may be executed in other orders. Also, at least a portion of the steps of the present invention may include a plurality of sub-steps or a plurality of stages, which are not necessarily performed at the same time, but may be performed at different times, and the sub-steps or stages may not necessarily be performed sequentially, but may be performed alternately or alternately with at least a portion of the sub-steps or stages of other steps or other steps.

It will be appreciated by those of ordinary skill in the art that all or a portion of the flow of implementing the methods of the embodiments described above may be accomplished by a computer program that may be stored in a non-volatile computer readable storage medium and that the computer program, when executed, may include the flow of the embodiments of the methods described above. Any reference to memory, storage, database or other medium used in the embodiments provided herein may include non-volatile and/or volatile memory. The non-volatile memory may include read only memory (ROM), programmable ROM (PROM), electrically programmable ROM (EPROM), electrically erasable programmable ROM (EEPROM), or flash memory. The volatile memory may include a random access memory (RAM) or an external cache memory. By way of illustration and not limitation, RAM is available in a variety of forms, such as static RAM (SRAM), dynamic RAM (DRAM), synchronous DRAM (SDRAM), double data rate SDRAM (DDRSDRAM), enhanced SDRAM (ESDRAM), synchronous link (Synchlink) DRAM (SLDRAM), memory bus (Rambus) direct RAM (RDRAM), direct memory bus dynamic RAM (DRDRAM), and memory bus dynamic RAM (RDRAM).

Figure 5:
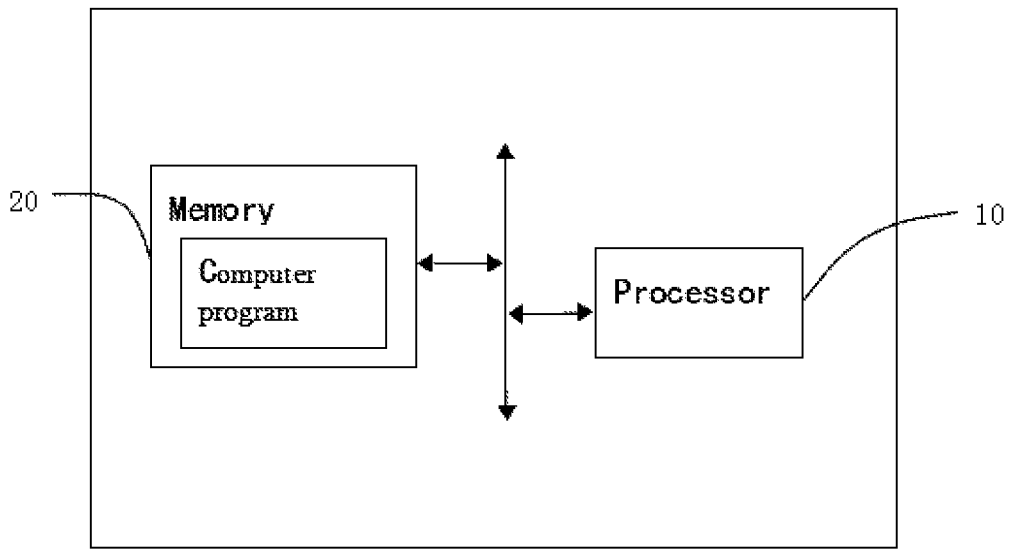
FIG. 5 is a schematic structural diagram of an embodiment of a terminal according to the present invention.

Based on the above-mentioned embodiments, the present disclosure also provides a terminal, whose schematic block diagram can be shown in FIG. 5. The terminal includes a memory 10 in which a computer program is stored and a processor 20 which, when executing the computer program, can perform at least the following steps.

Reading data from a first database and capturing a dynamic data log in the first database; Joining data to a waiting queue read from the first database; Determining a dislocation category of the data in the waiting queue, and rearranging the dislocation data in the waiting queue into a first category according to the dynamic data log; and Synchronizing the rearranged data to a second database.

Wherein the data is read from the first database through a LinkedIn data bus.

Wherein a RabbitMQ engineering cache is used for joining data read from the first database to the waiting queue.

Wherein rearranging the dislocation data in the waiting queue according to the dynamic data log into the dislocation data of the first category comprises the following steps.

Extracting the dislocation data in the waiting queue into a restriction engine when the dislocation category of the data in the waiting queue is the first category; and Rearranging the data in the restriction engine when the content in the restriction engine is not null.

Wherein the rearranging the data in the restriction engine comprises: Obtaining a data read time and a data bus run time for reading data from the first database according to the dynamic data log; And rearranging the data in the restriction engine according to the data reading time and the data bus running time.

Wherein after determining the dislocation category of the data in the waiting queue, the method further comprises the step of: Initiating data synchronization state policing when the dislocation category of the data in the waiting queue is a second category.

Wherein synchronizing the rearranged data to the second database comprises the following steps.

Adding the rearranged data to an uploading queue, when the content in the restriction engine is null; and Collecting the cached data in the uploading queue and synchronizing the cached data in the uploading queue to the second database.

Wherein after the collecting the cached data in the uploading queue, the method further comprises the step of: Converting the uploading queue into an applicable UPSERT or DELETE queue.

The present disclosure also provides a storage medium storing storing at least one program executable by at least one processor to implement the steps of the database synchronization method described in the above embodiments.

When executing the computer program, can perform at least the following steps.

Reading data from a first database and capturing a dynamic data log in the first database; Joining data to a waiting queue read from the first database; Determining a dislocation category of the data in the waiting queue, and rearranging the dislocation data in the waiting queue into a first category according to the dynamic data log; and Synchronizing the rearranged data to a second database.

Wherein the data is read from the first database through a LinkedIn data bus.

Wherein a RabbitMQ engineering cache is used for joining data read from the first database to the waiting queue.

Wherein rearranging the dislocation data in the waiting queue according to the dynamic data log into the dislocation data of the first category comprises the following steps.

Extracting the dislocation data in the waiting queue into a restriction engine when the dislocation category of the data in the waiting queue is the first category; and Rearranging the data in the restriction engine when the content in the restriction engine is not null.

Wherein the rearranging the data in the restriction engine comprises: Obtaining a data read time and a data bus run time for reading data from the first database according to the dynamic data log; And rearranging the data in the restriction engine according to the data reading time and the data bus running time.

Wherein after determining the dislocation category of the data in the waiting queue, the method further comprises the step of: Initiating data synchronization state policing when the dislocation category of the data in the waiting queue is a second category.

Wherein synchronizing the rearranged data to the second database comprises the following steps.

Adding the rearranged data to an uploading queue, when the content in the restriction engine is null; and Collecting the cached data in the uploading queue and synchronizing the cached data in the uploading queue to the second database.

Wherein after the collecting the cached data in the uploading queue, the method further comprises the step of: Converting the uploading queue into an applicable UPSERT or DELETE queue.

Finally, it should be noted that the above embodiments are merely the preferred embodiments of the present disclosure, and are not intended to limit the present disclosure. Any modifications, equivalent substitutions and improvements made within the spirit and principles of the present disclosure should be included in the protection of the present disclosure within the scope.

What is claimed is:

1. A database synchronization method, comprising:
    reading data from a first database and capturing a dynamic data log in the first database;
    joining data to a waiting queue read from the first database;
    determining a dislocation category of the data in the waiting queue, and rearranging the dislocation data in the waiting queue into a first category according to the dynamic data log; and
    synchronizing the rearranged data to a second database;
    wherein rearranging the dislocation data in the waiting queue according to the dynamic data log into the dislocation data of the first category comprises:
        extracting the dislocation data in the waiting queue into a restriction engine when the dislocation category of the data in the waiting queue is the first category; and
        rearranging the data in the restriction engine when the content in the restriction engine is not null.

2. The database synchronization method according to claim 1, wherein the data is read from the first database through a LinkedIn data bus.

3. The database synchronization method according to claim 1, wherein a RabbitMQ engineering cache is used for joining data read from the first database to the waiting queue.

4. The database synchronization method according to claim 1, wherein rearranging the data in the restriction engine comprises:
    obtaining a data reading time and a data bus running time for reading data from the first database according to the dynamic data log; and
    rearranging the data in the restriction engine according to the data reading time and the data bus running time.

5. The database synchronization method according to claim 1, wherein after determining the dislocation category of the data in the waiting queue, the method further comprises:
    initiating data synchronization state policing when the dislocation category of the data in the waiting queue is a second category.

6. The database synchronization method according to claim 1, wherein synchronizing the rearranged data to the second database comprises:
    adding the rearranged data to an uploading queue, when the content in the restriction engine is null; and
    collecting the cached data in the uploading queue and synchronizing the cached data in the uploading queue to the second database.

7. The database synchronization method according to claim 6, wherein after the collecting the cached data in the uploading queue, the method further comprises:
    converting the uploading queue into an applicable UPSERT or DELETE queue.

8. A terminal comprising a processor, a storage medium communicatively connected to the processor, the storage medium being adapted to store a plurality of instructions, the processor being adapted to invoke the instructions in the storage medium to perform the steps of implementing the database synchronization method according to claim 1.

9. The terminal according to claim 8, wherein the data is read from the first database through a LinkedIn data bus.

10. The terminal according to claim 8, wherein rearranging the data in the restriction engine comprises:
    obtaining a data reading time and a data bus running time for reading data from the first database according to the dynamic data log; and
    rearranging the data in the restriction engine according to the data reading time and the data bus running time.

11. The terminal according to claim 8, wherein after determining the dislocation category of the data in the waiting queue, the method further comprises:
    initiating data synchronization state policing when the dislocation category of the data in the waiting queue is a second category.

12. The terminal according to claim 8, wherein synchronizing the rearranged data to the second database comprises:
    adding the rearranged data to an uploading queue, when the content in the restriction engine is null;

collecting the cached data in the uploading queue and synchronizing the cached data in the uploading queue to the second database; and converting the uploading queue into an applicable UPSERT or DELETE queue.

* * * * *